United States Patent [19]
Zanetti

[11] 3,914,982
[45] Oct. 28, 1975

[54] DEVICE FOR MEASURING THE RELATIVE MOISTURE OF A GASEOUS MEDIUM OR THE EQUILIBRIUM MOISTURE OF A MATERIAL

[75] Inventor: Luciano Zanetti, Fadmatt, Switzerland

[73] Assignee: Sina Aktiengesellschaft für Instrumentierung und Automatik, Zürich, Switzerland

[22] Filed: July 6, 1973

[21] Appl. No.: 377,146

[30] Foreign Application Priority Data
July 10, 1972 Switzerland.................. 10320/72

[52] U.S. Cl. .................. 73/29; 73/73; 73/336.5; 324/65 R; 338/35
[51] Int. Cl.² ............................................ G01W 1/11
[58] Field of Search .......... 73/29, 336.5, 73, 335, 73/336; 338/34, 35; 324/65 R

[56] References Cited
UNITED STATES PATENTS
| | | |
|---|---|---|
| 2,845,790 | 8/1958 | Eddy.. |
| 2,859,318 | 11/1958 | Ohlheiser.............................. 73/335 |
| 3,365,936 | 1/1968 | Hubin et al............................. 73/73 |
| 3,416,356 | 12/1968 | Bridgeman........................ 73/336.5 |

FOREIGN PATENTS OR APPLICATIONS
141,665   12/1960   U.S.S.R................... 73/336.5

Primary Examiner—Richard C. Queisser
Assistant Examiner—Marcus S. Rasco
Attorney, Agent, or Firm—Woodhams, Blanchard and Flynn

[57] ABSTRACT

A device for measuring the relative moisture of a gaseous medium or the equilibrium moisture of a material. The device has a hygrometer sensing element having a moisture-dependent electric resistance, which is arranged in a holder. The holder is at least partly formed of a non-hygroscopic heat insulating body with hollow spaces closed in themselves.

5 Claims, 7 Drawing Figures

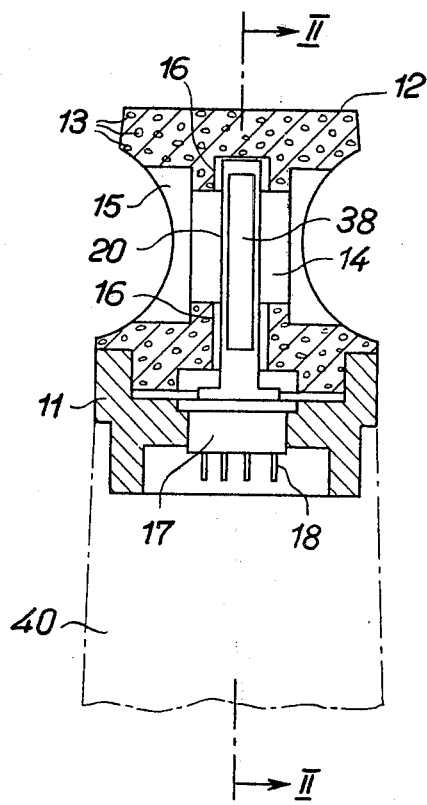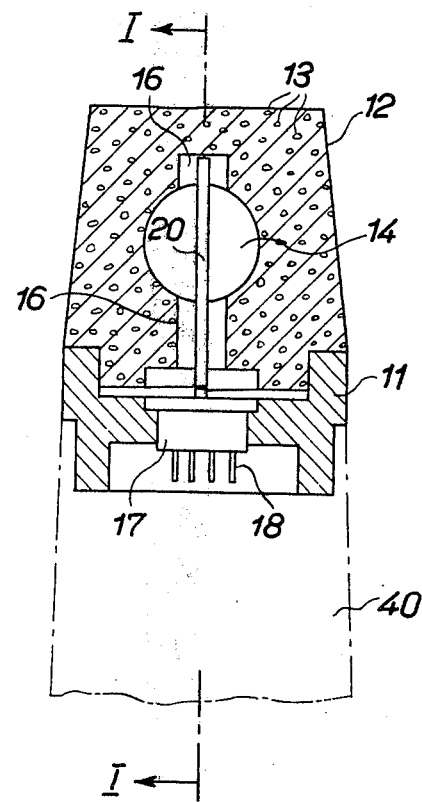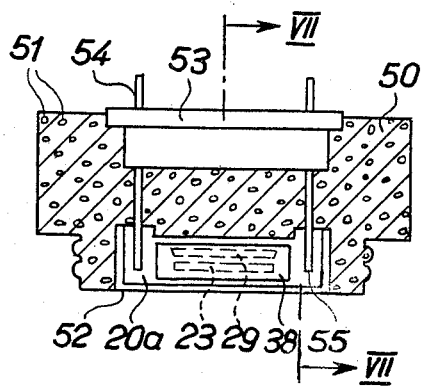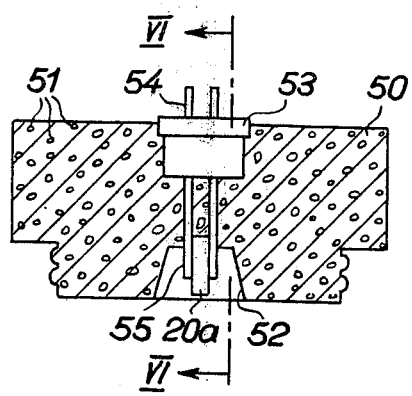

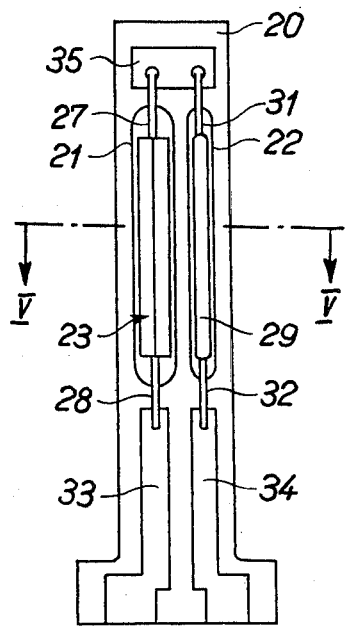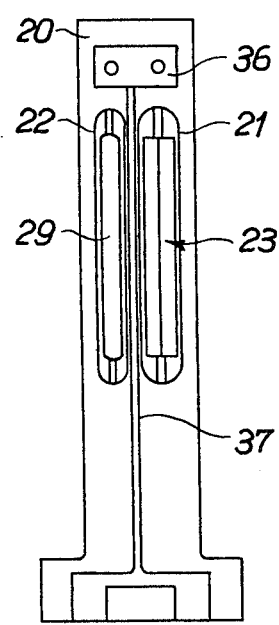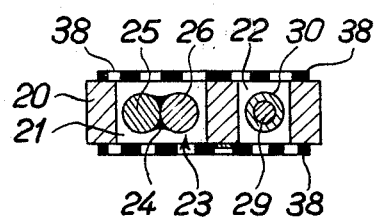

DEVICE FOR MEASURING THE RELATIVE MOISTURE OF A GASEOUS MEDIUM OR THE EQUILIBRIUM MOISTURE OF A MATERIAL

The invention relates to a device for measuring the relative moisture of a gaseous medium or the equilibrium moisture of a material. The device possesses a hygrometer sensing element provided with a moisture-dependent electric resistance, which is arranged in a holder.

The object of the invention is to provide a device of the type mentioned such that it exhibits a more favourable time behaviour as regards temperature and moisture dependence.

This object is substantially achieved with the device according to the invention in that the holder is at least partly formed by a non-hygroscopic thermal insulating body with hollow spaces closed in themselves. Preferably, the body of insulating material may consist of foamed polymer plastic.

In a particularly appropriate form of execution of the device the hygrometer sensing element may be housed in a recess of a plate-shaped bearer, which is situated in the holder, and in this form of execution the recess is covered by filter layer adjoining the bearer. Also, an electric reference resistance, independent of the surrounding moisture, with at least approximately the same temperature dependence of the resistance value as the moisture-dependent resistance of the hygrometer sensing element, may be housed in a recess of the plate-shaped bearer. For the purpose the holder has the form of a housing accommodating the plate-shaped bearer, said housing being provided with at least one inlet opening for a gaseous medium.

Further details and their advantages are supplied by the description, which now follows, of examples of embodiment of the subject of the invention, and from the relevant drawings.

FIG. 1 shows as first example of execution a device for measuring the relative moisture of gaseous media, in particular air, in longitudinal section along line I—I in FIG. 2;

FIG. 2 shows the same form of execution in longitudianl section along line II—II in FIG. 1;

FIG. 3 represented in larger scale a detail of the same form of execution in front view;

FIG. 4 shows the same detail viewed from the rear;

FIG. 5 is a cross-section taken along line V—V in FIG. 3 on a still larger scale;

FIG. 6 shows as a second example of execution a device for measuring the relative equilibrium moisture of a material by setting up on the material, in axial section along line VI—VI in FIG. 7;

FIG. 7 shows the same device in cross-section along line VII—VII in FIG. 6.

The device for measuring the relative moisture of gaseous media, e.g. air, represented in FIGS. 1 and 2, has a housing consisting of a lower section 11 and of an upper section 12. Each of the housing sections 11 and 12 is made of a non-hygroscopic heat-insulating material, preferably of a polymer plastic, such as, e.g. polystyrol. At least the upper section 12, which has the greater volume, is an insulating material body with many porous hollow spaces 13 closed in themselves. The upper section 12 is appropriately made of foamed plastic. All the surfaces of the part 12 are, however, relatively smooth and free from pores. The bottom section 11 could be made of the same type of material as section 12. However, it is also possible to form the bottom portion 11 of unfoamed plastic.

The upper section 12 has the shape of a truncated cone and possesses a diametrally through-extending recess (or through passage) 14 with widened openings 15, which form inlet openings for a gaseous medium, the relative moisture of which is to be measured. Furthermore, the upper section 12 is provided with an axial recess 16, which crosses the diametral recess 14.

The bottom section 11 of the housing is dish-shaped. In the central portion of the bottom section 11 there is an electric plug 17 with three or more plug pins 18, which are accessible on the underside of the lower section 11. On the opposite side of the plug 17, the one end of a bearer 20 consisting of an electric insulating material is secured, and it has the form of a plate. This bearer 20 extends along the axial recess 16 and crosses the diametral recess 14 of the upper section 12. The housing portions 11 and 12 form together a holder for the plug 17 and the bearer 20. The further construction of the bearer 20 and of the parts secured in it will now be explained with reference to FIGS. 3 to 5.

In the plate-shaped bearer 20 there are two parallel through slits (or elongate holes) 21 and 22 running side by side. The one slit 21 contains one hygrometer sensing element 23, which has a moisture-dependent electric resistance 24 (FIG. 5). The latter is formed by a small amount of a hygroscopic electrolyte, e.g. a lithium salt solution. The electrolyte is held by capillary forces in the groove between two rods 25 and 26 running side by side, of cylindrical shape, and accordingly cannot flow away. The rods 25 and 26 are made of electrically insulating, unhygroscopic material, preferably quartz glass, and are connected in pairs at their ends by a glueing agent or are joined together by fusion. At each end of the hygrometer sensing element a connection wire 27 or 28 (FIG. 3) is arranged, which is connected with the electrolyte 24.

The other slit 22 of the plate-shaped bearer 20 contains an electric reference resistance 29, which is independent of the ambient moisture and has at least approximately the same temperature dependence of the resistance value as the moisture-dependent resistance of the hygrometer sensing element 23. Preferably, the reference resistance 29 is also formed by an electrolyte which has appropriately the same composition as the electrolyte 24, but is enclosed in a small tube 30 (FIG. 5), hermetically sealed at both ends and of electrically insulating material, preferably quartz glass. Connection wires 31 and 32 (FIG. 3) are arranged at both ends of the small tube 30.

The plate-shaped bearer 20 has on its two flat sides electric conductor tracks 33, 34, 35 (FIG. 3) or 36, 37, which are provided for the connection of the connecting wires 27, 28 of the hygrometer sensing element 23 as well as of the connecting wires 31, 32 of the reference resistance with pins 18 of the plug 17.

Finally, each of the flat sides, lying opposite each other, of the plate-shaped bearer 20 is covered with a filter layer 38 (FIGS. 1 and 5), which filter layers cover the openings of the slits 21 and 22. The filter layers 38 are permeable to moisture and consist of a electrically insulating, nonhygroscopic material, which is preferably inert chemically to aggressive gases. The task of the filter layers 38 is primarily to protect the electrolyte 24 of the hygrometer sensing element 23 agaisnt dust and liquid drips. In addition, the filter layers 38 also afford a certain mechanical protection to the hydrometer sensing element 23, the reference resistance 29 and the conductor tracks 33 to 37. The filter layers may appropriately each consist of an impregnated fine mesh of plastic threads and secured by means of a glueing agent to the bearer 20. In FIGS. 3 and 4 the filter layers have not been drawn in for the sake of clarity.

The device described is intended to be plugged on an electric apparatus 40 (FIGS. 1 and 2) which has a socket fitting the plug 17. The apparatus 40 contains electric switching means, to feed the moisture-dependent resistance 24 and the reference resistance 29 with electric current, and to find out the difference at any time of the resistance values of the two resistances mentioned 24 and 29. This difference of the resistance values is a measurement of the relative moisture prevailing at any time, of the gaseous medium surrounding the hygrometer sensing device 23. The apparatus 40 may for the purpose have a scale calibrated direct in moisture percentages.

The form of execution of the device according to the invention shown in FIGS. 6 and 7 serves specially for the measuring of the relative moisture of a material, for example a strip of paper. The device has a housing 50 consisting in a single piece of material, which is made of a non-hygroscopic heat insulating material with numerous closed pore-like hollow spaces 51. Preferably, the housing is of foamed polymer plastic, such as e.g. polystyrene.

The housing 50 acts as holder of a plate-shaped bearer 20a, which is provided in a similar manner as the bearer 20 described above with a hygrometer sensing device 23 and a reference resistance 29. Similarly the bearer 20a is covered on both sides with a filter layer 38. Contrary to the first example of embodiment, however, in the form of execution according to FIGS. 6 and 7, the bearer 20a is housed, running diametrally to the housing 50, in a groove-shaped recess 52 on the underside of the housing 50. An electric plug 53 is introduced into the upper side of the housing 50, and it has three or more plug pins 54 accessible from above. A number of electric conductors 55 connect the resistance of the hygrometer sensing device 23 and the reference resistance 29 with conjugated plug pins 54. With the plug 53 it is possible to connect a multiple-lead cable which serves for the connection of the device described with an electric instrument similar to apparatus 40.

In use, the device described in FIGS. 6 and 7 is placed on the material, the moisture of which is to be measured. In the recess 52, open against the material, but otherwise closed there is then created a relative air moisture, which is in equilibrium with the moisture of the material and is measured in similar manner as in the first example of execution. The device according to FIGS. 6 and 7 may also be placed like a closure cap on a vessel which contains loose material, the moisture of which is to be measured.

Each of the described methods of execution of the device according to the invention has the principal advantage that the housing 11, 12 or 50 acting as a holder for the bearer 20 or 20a, being thus the housing for the hygrometer sensing element 23, because of its low thermal conductivity and its small heat storage capacity, makes it possible to obtain an accurate moisture measurement already after a considerably shorter time than previously, as the influence of the housing 11, 12 or 50 upon the thermal time behaviour of the hygrometer sensing element 23 is outstandingly small. This advantage is obtained in that the housing is for the far greater part, or completely, made of a heat insulating material with pore-like hollow spaces 13 to 51, closed in themselves. As the housing 11, 12 or 50 furthermore consists in a non-hygroscopic body, it does not have either any disturbing influence upon the moisture of the gaseous medium surrounding the hygrometer sensing element 23, and upon the moisture behaviour of the hygrometer sensing element 23.

In non-represented alternatives of the examples of execution described it is provided that the plate-shaped bearer 20 or 20a has an additional recess in which an electric temperature measuring element, e.g. an electric resistance with high temperature coefficient is housed. This temperature measuring element is then connected, similarly to the hygrometer sensing element 23 and the reference resistance 29 by means of conductor tracks mounted on the bearer with conjugated contact pins of the plug 17 or 53. With the described alternative executions it is possible to ascertain electrically not only the moisture but also at the same time the temperature of the gaseous medium surrounding the plate-shaped bearer 20 or 20a.

The embodiments of the invention in which an exclusive property or privilege is claimed are defined as follows:

1. A device for measuring the relative moisture of a gaseous medium or the equilibrium moisture of a material, including a holder having means for ingress and egress of moisture, a hygrometer sensing element having a moisture-dependent electric resistance and arranged in said holder in communication with said ingress and egress means, comprising the improvement wherein the holder is at least partly formed of a non-hygroscopic heat insulating body with hollow spaces closed in themselves, and including a plate-shaped bearer located in the holder, the hygrometer sensing element being housed in a hole in said plate-shaped bearer, and a filter layer adjacent to the bearer and covering said hole, wherein the hole in the plate-shaped bearer is larger than the hygrometer sensing element, the bearer having flat sides lying opposite each other and each covered with said filter layer.

2. A device for measuring the relative moisture of a gaseous medium or the equilibrium moisture of a material, comprising:

a holder comprising a non-hygroscopic heat insulating body with distributed hollow spaces closed in themselves, the material of which is foamed plastic of low thermal conductivity and thermal capacity, said body including means for ingress and egress of moisture and defining at least one inlet opening;

a plate-shaped bearer disposed internally of said holder within said opening;

a hygrometer sensing element having a moisture-dependent electric resistance and which is carried by said plate-shaped bearer and exposed to moisture entering the atmosphere in said opening for measuring same, the plate-shaped bearer including at least one recess loosely housing therein said hygrometer sensing element, said bearer carrying a filter layer loosely covering said hygrometer sensing element, wherein one electric reference resistance independent of the ambient moisture with at least approximately the same temperature dependence of the resistance value as the moisture-dependent resistance of the hygrometer sensing element is also housed in a recess of the plate-shaped bearer, the plate-shaped bearer being made of electrically insulating material and having conductor tracks for connection both of the electric resistance of the hygrometer sensing element and of the reference resistance with a contact device;

whereby moisture from outside the holder can readily contact the hygrometer sensing element, adverse effects by the relatively voluminous holder on quick adaptation to environmental temperature and moisture by the hygrometer sensing element are minimized and positive mechanical protection of the sensing element by the holder is obtained.

3. A device for measuring the relative moisture of a gaseous medium or the equilibrium moisture of a material, including a holder having means for ingress and egress of moisture, a hygrometer sensing element having a moisture-dependent electric resistance and arranged in said holder in communication with said ingress and egress means, comprising the improvement wherein the holder is at least partly formed of a nonhygroscopic heat insulating body with hollow spaces closed in themselves, and including a plate-shaped bearer located in the holder, the hygrometer sensing element being housed in a hole in said plate-shaped bearer, and a filter layer adjacent to the bearer and covering said hole, an electric reference resistance independent of the ambient moisture and having at least approximately the same temperature dependence of resistance value as the moisture-dependent resistance of said hygrometer sensing element, said electric reference resistance also being housed in a hole in said plate-shaped bearer, wherein the holes in said plate-shaped bearer are two elongate slits running parallel alongside each other and housing therein the hygrometer sensing element and reference resistance, the bearer having oppositely placed flat sides, said filter layer covering each of said two flat sides and said two slits.

4. A device for measuring the relative moisture of a gaseous medium or the equilibrium moisture of a material, comprising:
 a holder comprising a non-hygroscopic heat insulating body with distributed hollow spaces closed in themselves, the material of which is foamed plastic of low thermal conductivity and thermal capacity, said body including means for ingress and egress of moisture and defining at least one inlet opening;
 a plate-shaped bearer disposed internally of said holder within said opening;
 a hygrometer sensing element having a moisture-dependent electric resistance and which is carried by said plate-shaped bearer and exposed to moisture entering the atmosphere in said opening for measuring same, said holder body comprising a single piece of closed pore plastic, said holder opening being a blind recess opening through the underside of said holder and longitudinally extending substantially diametrally of said holder, wherein said holder is adapted for measurement of moisture in a material therebeneath, said bearer extending substantially diametrally of said holder in said blind recess with said one side edge facing out of said recess and the opposite side edge having at least portions engaging the closed end wall of said recess, and including conductors extending from said engaging edge portions through the body of said holder to its face opposite said recess for electrical connection;

whereby moisture from outside the holder can readily contact the hygrometer sensing element adverse effects by the relatively voluminous holder on quick adaptation to environmental temperature and moisture by the hygrometer sensing element are minimized and positive mechanical protection of the sensing element by the holder is obtained.

5. A device for measuring the relative moisture of a gaseous medium or the equilibrium moisture of a material, comprising:
 a holder comprising a non-hygroscopic heat insulating body with distributed hollow spaced closed in themselves, the material of which is foamed plastic of low thermal conductivity and thermal capacity, said body including means for ingress and egress of moisture and defining at least one inlet opening;
 a plate-shaped bearer disposed internally of said holder within said opening;
 a hygrometer sensing element having a moisture-dependent electric resistance and which is carried by said plate-shaped bearer and exposed to moisture entering the atmosphere in said opening for measuring same, the plate-shaped bearer including at least one recess loosely housing therein said hygrometer sensing element, said bearer carrying a filter layer loosely covering said hygrometer sensing element, the sensing element comprising two cylindrical rods of unhygroscopic electrically insulating material, and arranged side-by-side with joined ends and forming a longitudinal groove therebetween, and an electrolyte solution held by capillary forces in said groove for defining a moisture dependent electrical resistance;

whereby moisture from outside the holder can readily contact the hygrometer sensing element, adverse effects by the relatively voluminous holder on quick adaptation to environmental temperature and moisture by the hygrometer sensing element are minimized and positive mechanical protection of the sensing element by the holder is obtained.

* * * * *